US011718060B2

(12) United States Patent
Demers

(10) Patent No.: US 11,718,060 B2
(45) Date of Patent: Aug. 8, 2023

(54) POWERED OUTLET CHUTE FOR DUNNAGE CONVERSION MACHINE

(71) Applicant: Ranpak Corp., Concord Township, OH (US)

(72) Inventor: Raimond P. M. Demers, Landgraaf (NL)

(73) Assignee: Ranpak Corp., Concord Township, OH (US)

(*) Notice: Subject to any disclaimer, the term of this patent is extended or adjusted under 35 U.S.C. 154(b) by 0 days.

(21) Appl. No.: 16/647,169

(22) PCT Filed: Sep. 28, 2018

(86) PCT No.: PCT/US2018/053282
§ 371 (c)(1),
(2) Date: Mar. 13, 2020

(87) PCT Pub. No.: WO2019/070511
PCT Pub. Date: Apr. 11, 2019

(65) Prior Publication Data
US 2021/0023808 A1 Jan. 28, 2021

Related U.S. Application Data

(60) Provisional application No. 62/567,206, filed on Oct. 2, 2017.

(51) Int. Cl.
*B31D 5/00* (2017.01)

(52) U.S. Cl.
CPC ...... *B31D 5/0047* (2013.01); *B31D 2205/007* (2013.01); *B31D 2205/0047* (2013.01); *B31D 2205/0058* (2013.01)

(58) Field of Classification Search
CPC .... B31D 2205/0047; B31D 2205/0058; B31D 2205/007; B31D 2205/0094; B31D 5/0047
See application file for complete search history.

(56) References Cited

U.S. PATENT DOCUMENTS 5,123,889 A * 6/1992 Armington .......... B31D 5/0047 493/352
5,674,172 A 10/1997 Armington
(Continued)

FOREIGN PATENT DOCUMENTS

CA 2176730 A1 5/1995
CN 101970221 A 2/2011
(Continued)

OTHER PUBLICATIONS

International Search Report and Written Opinion dated Jan. 22, 2019 for International Patent Application No. PCT/US2018/053282.

(Continued)

*Primary Examiner* — Andrew M Tecco
*Assistant Examiner* — Nicholas E Igbokwe
(74) *Attorney, Agent, or Firm* — Renner, Otto, Boisselle & Sklar, LLP

(57) ABSTRACT

A dunnage conversion machine that converts a stock material into a less dense dunnage product includes an outlet chute having a housing with a passage therethrough from an inlet at an inlet end downstream to an outlet at an outlet end spaced from the inlet end. The output chute includes a lower guide surface that defines a bottom side of the passage. The lower guide surface has an upstream end toward the inlet and a downstream end toward the outlet. The upstream end of the lower guide surface is spaced from a centerline of the passage a distance that is greater than a distance that the downstream end is spaced from the centerline of the passage to provide an inclined surface, such that a cross-section of the passage decreases from the inlet to the outlet.

13 Claims, 6 Drawing Sheets

(56) References Cited

U.S. PATENT DOCUMENTS

| | | | | |
|---|---|---|---|---|
| 6,077,209 | A | 6/2000 | Armington et al. | |
| 6,217,501 | B1 * | 4/2001 | Simmons, Jr. | B31D 5/0047 493/464 |
| 2016/0060014 | A1 * | 3/2016 | Timmers | B31C 11/02 206/591 |
| 2017/0066215 | A1 * | 3/2017 | Cheich | B31D 5/0047 |
| 2017/0259522 | A1 * | 9/2017 | Cheich | A63J 5/021 |
| 2017/0313017 | A1 * | 11/2017 | Cheich | B31D 5/0069 |

FOREIGN PATENT DOCUMENTS

| | | | | |
|---|---|---|---|---|
| EP | 0903219 | A2 * | 3/1999 | B31D 5/0047 |
| JP | H10507134 | A | 7/1998 | |
| WO | 2019070511 | A1 | 4/2019 | |

OTHER PUBLICATIONS

International Preliminary Report on Patentability dated Apr. 8, 2020 for PCT/US2018/053282.

* cited by examiner

POWERED OUTLET CHUTE FOR DUNNAGE CONVERSION MACHINE

RELATED APPLICATIONS

This application is a national phase of International Application No. PCT/US2018/053282 filed Sep. 28, 2018, and published in the English language, and which claims priority to U.S. Provisional Patent Application No. 62/567,206 filed Oct. 2, 2017, both of which are hereby incorporated herein by reference.

FIELD OF THE INVENTION

This invention relates generally to a powered outlet chute for a machine that converts a stock material into a dunnage product useful for packaging, and a dunnage conversion machine including such an outlet chute.

BACKGROUND

In the process of shipping an item from one location to another, a protective packaging material is typically placed in the shipping case, or box, to fill any voids or to cushion the item during the shipping process. Some conventional protective packaging materials are plastic foam peanuts and plastic bubble pack.

Paper protective packaging material is a very popular alternative to the conventional plastic packaging materials. Paper is biodegradable, recyclable and made from a renewable resource, making it an environmentally responsible choice for conscientious industries. Furthermore, paper protective dunnage material is particularly advantageous for use with particle-sensitive merchandise, as its clean, dust-free surface is resistant to electrostatic buildup.

While paper in sheet form could possibly be used as a protective packaging material, packaging companies usually prefer to convert the sheets of paper into a relatively lower density dunnage product. This conversion may be accomplished by a dunnage conversion machine, such as those disclosed in commonly assigned U.S. Pat. Nos. 4,968,291 and 5,123,889. Dunnage conversion machines typically convert a sheet stock material, such as paper, into a strip of dunnage having a lower density than the original stock material. Dunnage products of a desired length are severed or cut from the strip for use in packaging applications.

SUMMARY

The present invention provides an improved outlet for a dunnage conversion machine, and a dunnage conversion machine that includes such an outlet chute. The outlet chute extends the length of the path traveled by the dunnage, spacing the outlet of the chute from operative elements of the conversion machine, and provides a narrow outlet to deter the insertion of foreign objects into the outlet, while also actively driving dunnage products toward the outlet. The outlet chute thus may be suitable for dispensing variable lengths of dunnage, including dunnage that is shorter than the output chute.

More particularly, the present invention may provide a dunnage conversion machine that includes the following features: (a) a conversion assembly having (i) a forming assembly for shaping a stock material into a relatively lower density strip of dunnage, and (ii) a feed assembly downstream of the forming assembly, the feed assembly having at least one rotating element to draw a stock material through the forming assembly; (b) a severing assembly downstream of the conversion assembly to sever discrete lengths of dunnage products from the strip of dunnage produced by the conversion assembly; and (c) an output chute downstream of the severing assembly, configured to receive dunnage products from the severing assembly. The output chute includes a housing having a passage therethrough. The passage has an inlet at an inlet end, and an outlet at an outlet end spaced from the inlet end. The passage extends in a downstream direction from the inlet to the outlet. The output chute includes a lower guide surface that defines a bottom side of the passage, the lower guide surface having an upstream end toward the inlet and a downstream end toward the outlet, and the upstream end is spaced from a centerline of the passage a distance that is greater than a distance that the downstream end is spaced from the centerline of the passage to provide an inclined surface, such that a cross-section of the passage decreases from the inlet end to the outlet end.

The lower guide surface may include at least one rotating element that is driven to move the lower guide surface toward the outlet.

The dunnage conversion machine may further include a power source adapted to drive at least one of the at least one rotating elements.

The lower guide surface may be defined by a conveyor belt.

The dunnage conversion machine may further include an upper guide surface that defines a top side of the passage that is spaced from and nonparallel to the lower guide surface. The upper guide surface may have an upstream end toward the inlet and a downstream end toward the outlet, the upstream end may be spaced from a centerline of the passage a distance that is greater than a distance that the downstream end is spaced from the centerline of the passage to provide an inclined surface. Consequently, the upper guide surface and the lower guide surface may converge to a minimum spacing therebetween adjacent the outlet.

The upper guide surface may be defined by a conveyor belt.

Each of the upper and lower guide surfaces may include at least two rotating members.

Adjacent the outlet, the upper and lower guide surfaces may be closest to each other and may be spaced apart by 20 mm.

The upper and lower guide surfaces may be resilient.

Downstream ends of the upper and lower guide surfaces may be in a fixed position.

A distance from the closest spacing of the upper and lower guide members to the input end of the chute may be at least 140 mm.

The lower guide member may be a conveyor belt configured to provide a continuous surface from the upstream end of the lower guide member to the downstream end of the lower guide member.

The housing may have left and right side walls that define opposing sides of the passage through the output chute.

The present invention also may provide an output chute for a dunnage conversion machine that converts a stock material into a less dense dunnage product, wherein the output chute includes (a) a housing having a passage therethrough, the passage having an inlet at an inlet end, and an outlet at an outlet end spaced from the inlet end, and the passage extending in a downstream direction from the inlet to the outlet, and (b) a lower conveyor belt arranged to define a lower side of the passage. The conveyor belt may have an upstream end toward the inlet and a downstream end toward the outlet, and the upstream end may be spaced from a centerline of the passage further than the downstream end is spaced from a centerline of the passage to provide an inclined surface, such that a cross-section of the passage decreases from the inlet end to the outlet end.

These and other features of the present invention are described in detail in the following description and accompanying drawings.

DETAILED DESCRIPTION

Figure 1:
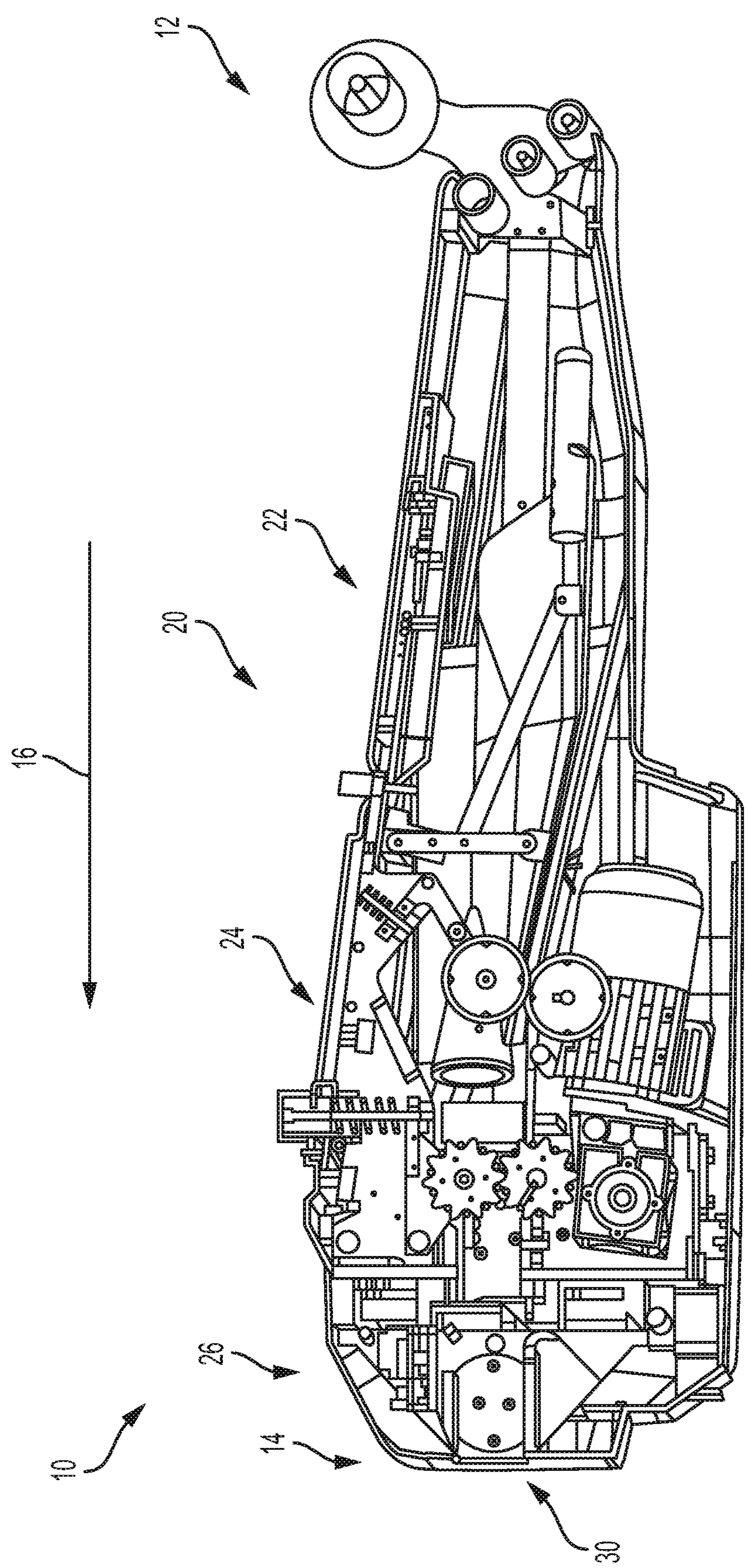
FIG. 1 is a cross-sectional elevational view of a prior art dunnage conversion machine.
Figure 2:
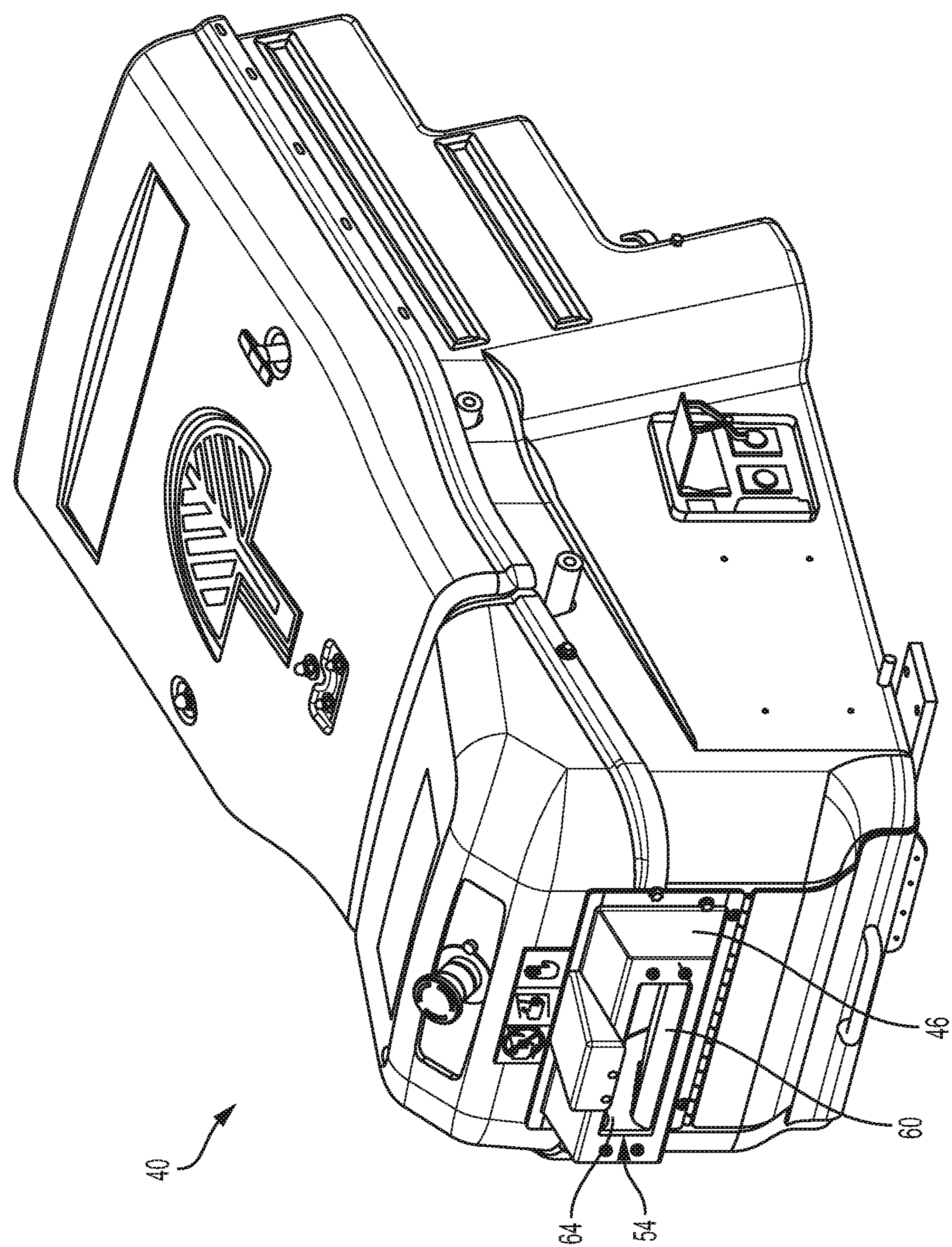
FIG. 2 is a perspective view of a dunnage conversion machine provided by the present invention.
Figure 3:
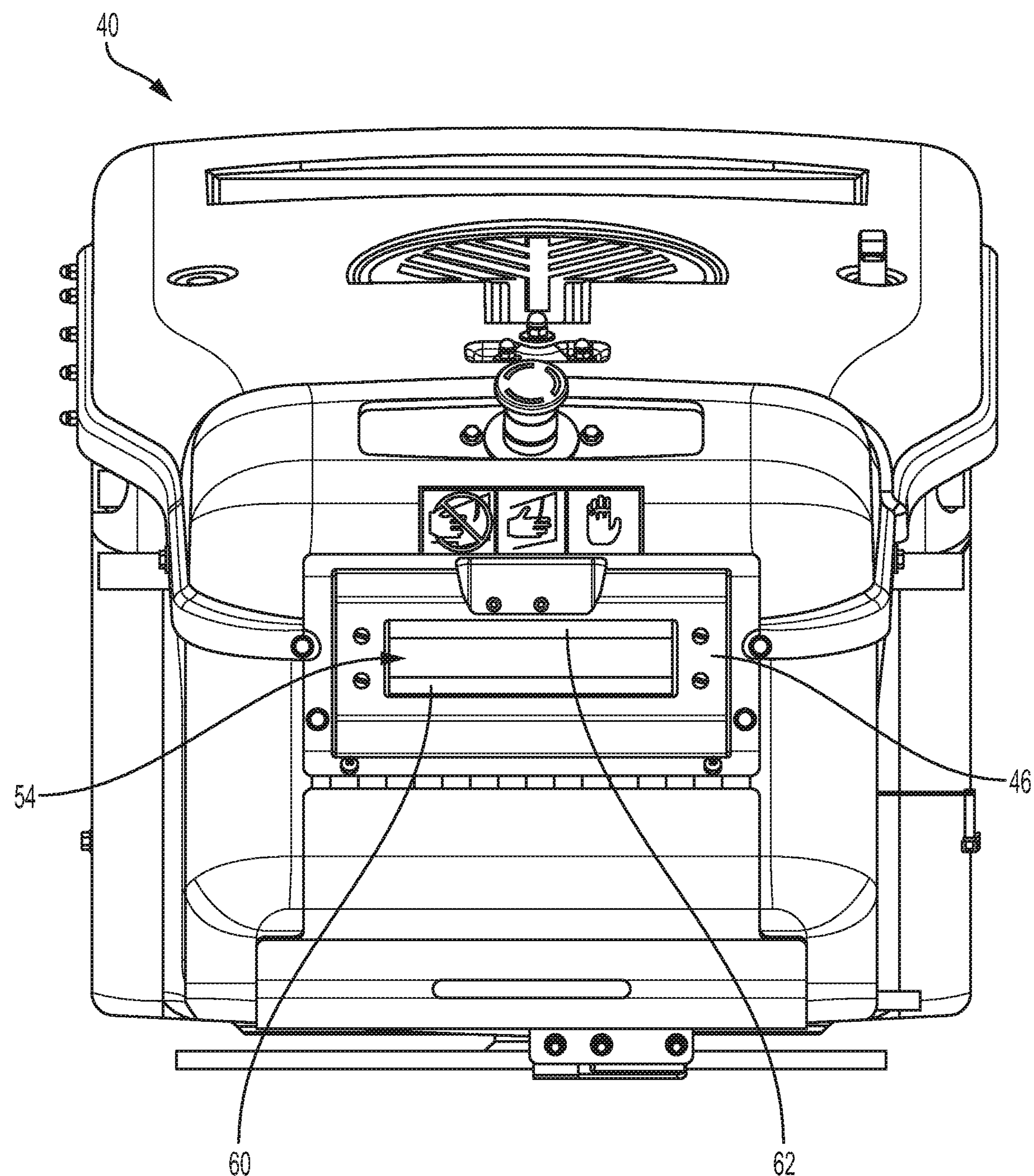
FIG. 3 is a front elevation view of the dunnage conversion machine of FIG. 2.
Figure 4:
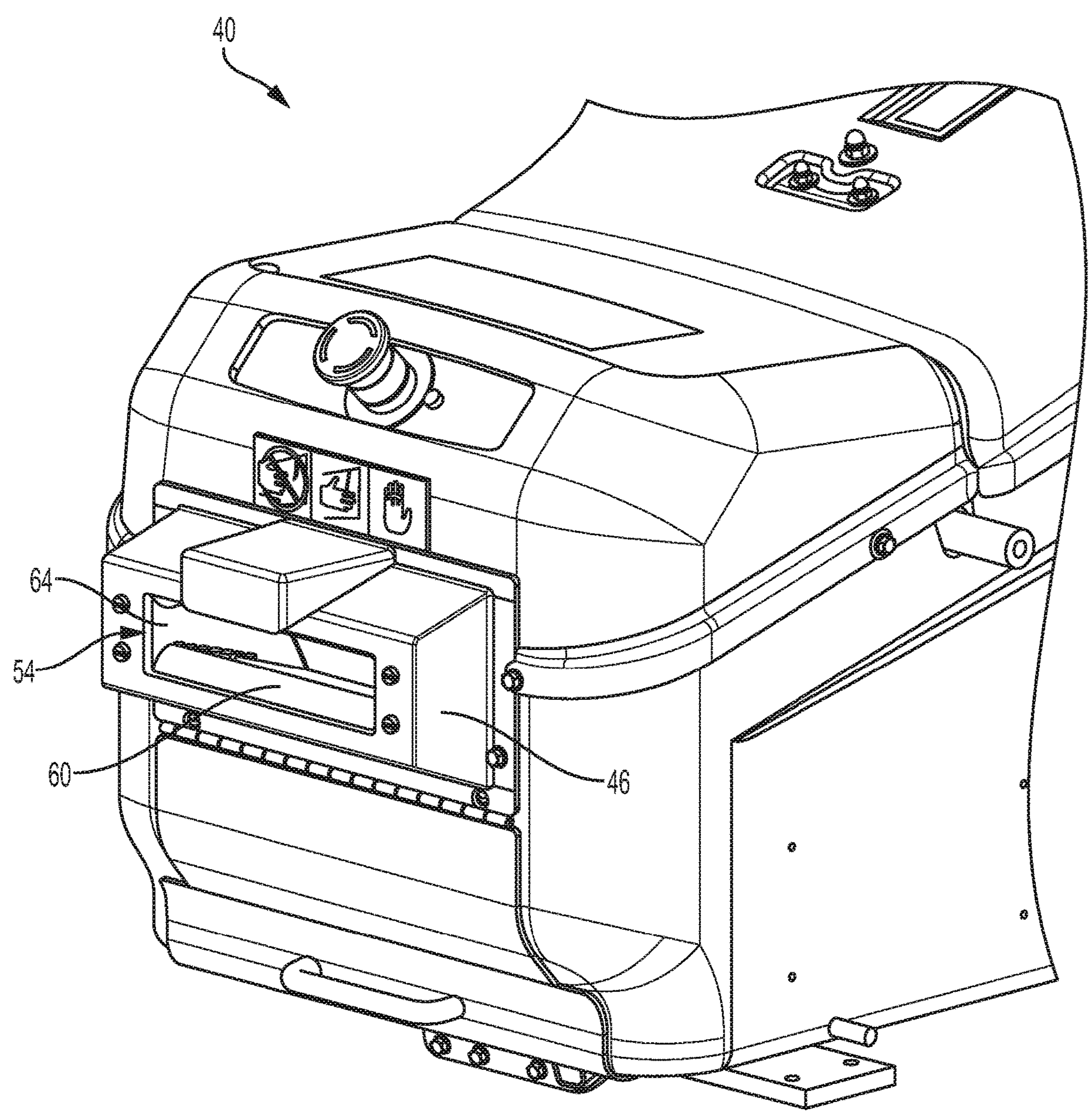
FIG. 4 is an enlarged front view of the dunnage conversion machine of FIG. 2

With reference to these drawings, FIG. 1 shows a prior art dunnage conversion machine 10, also referred to alternatively as a dunnage converter, conversion machine, or just the machine. The conversion machine 10 has an upstream end 12 and a downstream end 14, which define a downstream direction 16 in which a sheet stock material travels as it moves through the conversion machine 10 from the upstream end 12 to the downstream end 14. (The terms "upstream" and "downstream" in this context are characteristic of the direction of flow of the stock material through the dunnage conversion machine 10.) The upstream direction (not shown) is opposite the downstream direction 16.

A sheet stock material (not shown) is provided to the upstream end 12. The sheet stock material may be provided from a supply, typically in either as a tubular roll or a rectangular fan-folded stack. From the upstream end 12, the sheet stock material moves through a conversion assembly 20, typically including a forming assembly 22 that shapes the sheet material into a reduced-density volumetric shape, that is, a shape that has a relatively lower density than the original sheet material. The resulting strip of dunnage then travels downstream from the forming assembly 22 and through a feed assembly 24, which draws the sheet material through the forming assembly 22. The feed assembly 24 typically has at least one rotating element to draw the stock material through the forming assembly 22. The feed assembly 24 also may fix the shape of the sheet stock material, such as by coining or perforating the sheet material along a narrow band so that the strip of dunnage maintains its shape. From the conversion assembly 20, discrete dunnage products are cut or otherwise severed and separated from the strip of dunnage at a severing assembly 26 downstream of the conversion assembly 20. From the severing assembly 26, the dunnage products are dispensed from an outlet 30. An output chute may be provided, but it is generally unpowered and relatively short.

FIGS. 2 through 6 illustrate an exemplary dunnage conversion machine 40. The illustrated dunnage conversion machine 40 includes a conversion assembly 42 and a severing assembly 44 that convert the sheet material into a strip of dunnage and separate discrete dunnage products from the strip of dunnage, respectively, and are similar to or the same as corresponding conversion assembly 20 and severing assembly 26 of the conversion machine 10 shown in FIG. 1. The dunnage conversion machine 40 provided by the invention also has an output chute 46 downstream of the severing assembly 44, configured to receive dunnage products from the severing assembly 44.

The output chute 46 is essentially a tubular housing 48 with a passage 50 therethrough. The housing 48 generally has a rectangular cross-section. The housing 48 may have a constant cross-section or the housing 48 may converge in the downstream direction. The passage 50 has an inlet 52 at an inlet end, and an outlet 54 at an outlet end spaced from and downstream from the inlet 52, which is open to receive the strip of dunnage from the conversion assembly 42. The passage 50 extends in a downstream direction from the inlet 52 to the outlet 54. The output chute 46 further includes a lower guide surface 60 that defines a bottom side of the passage 50, and an upper guide surface 62 that defines a top side of the passage 50. Laterally-spaced left and right side walls 64 of the housing 48 define opposing sides of the passage 50 through the output chute 46.

The lower guide surface 60 has an upstream end toward the inlet 52 and a downstream end toward the outlet 54, and the upstream end is spaced from a centerline 66 of the passage 50 a distance that is greater than a distance that the downstream end is spaced from the centerline 66 of the passage 50 to provide an inclined surface, such that a cross-section of the passage 50 decreases from the inlet end to the outlet end (in the downstream direction).

Similarly, the illustrated upper guide surface 62 has an upstream end toward the inlet 52 and a downstream end toward the outlet 54 and the upstream end is spaced from the centerline 66 of the passage 50 a distance that is greater than a distance that the downstream end is spaced from the centerline 66 of the passage 50 to provide an inclined surface. Consequently, the upper guide surface 62 and the lower guide surface 60 converge to a minimum spacing therebetween adjacent the outlet 54. An exemplary minimum spacing between the closest approach of the upper guide surface 62 and the lower guide surface 60 is no more than 20 mm.

The outlet chute 46 provided by the invention also includes drive elements 70 that rotate to advance the dunnage products toward and out the outlet 54 of the output chute 46. In the illustrated embodiment, lower guide surface 60 and the upper guide surface 62 are formed by conveyor belts. Each conveyor belt extends between upstream and downstream rotating elements, one of which, the upstream rotating element in the illustrated embodiment, is driven to advance facing surfaces of the conveyor belts in a downstream direction. These upstream and downstream rotating elements include rotating elements, and in the illustrated embodiment the downstream rotating element is an idling roller and the upstream rotating element is connected to a drive shaft which extends through a side wall 64 of the housing 48 and is driven through a chain drive and sprockets coupling the respective drive shafts to a motor 72 or other power source adapted to drive the rotating elements 70. Both the upper guide surface 62 and the lower guide surface 60 typically are driven at the same speed.

The lower and upper guide surfaces 60 and 62 thus are part of a pair of nonparallel inclined conveyor belts that cooperate to drive the dunnage products through the passage 50 and out of the outlet 54. The conveyor belts may present a continuous lateral surface or may be composed of multiple, discrete, laterally-spaced conveyor belts. The conveyor belts generally have a sufficiently-rough surface to generate sufficient friction with the dunnage products to urge the dunnage products toward the outlet 54 at the downstream end of the output chute 46.

In this configuration, the length of the output chute 46, and the distance that the dunnage products must travel from the severing assembly 44 and the conversion assembly 42 to the outlet 54 may be increased, while still providing means for moving shorter dunnage products to the outlet 54. The distance from the outlet 54 to the severing assembly 44 or the conversion assembly 42 typically is at least 140 mm and may be more than 200 mm.

Downstream ends of the lower and upper guide surfaces 60 and 62 typically are fixed, and at that spacing may temporarily compress the dunnage products as they pass between the downstream ends of the lower and upper guide surfaces 60 and 62. Dunnage products typically have sufficient resiliency that such temporary compression generally will have little or no effect on the dunnage products' performance as a packing material.

Alternatively, the lower and upper guide surfaces 60 and 62 may be formed of a series of driven rollers arrayed to define the top and bottom of the passage 50 through the output chute 46. The rollers may be linked so that they are all driven, or fewer than all of the rollers may be driven. The upper guide surface 62 optionally may be formed by single roller opposite and spaced from the downstream end of the lower guide surface 60.

During operation of the machine 40, the conversion assembly 42 draws stock material downstream and shapes the stock material into a relatively less dense strip of dunnage. As the strip of dunnage continues downstream from the conversion assembly 42, the severing assembly 44 separates discrete lengths of dunnage products from the strip of dunnage. A leading end of the strip of dunnage may extend into the output chute 46 before the dunnage product is severed from the strip, whereupon the severed dunnage product continues downstream through the output chute 46. The output chute 46 drives the dunnage product out the outlet 54 for collection by an operator.

In operation, a leading end of a strip of dunnage will extend past the severing assembly. Depending on the stiffness of the stock material used to form the strip of dunnage, gravity may pull the end of the strip downward until it contacts the lower guide surface 60. The lower guide surface 60 is driven, and will urge the leading end of the strip of dunnage toward the outlet 54, alone or in concert with the upper guide surface 62. As the strip of dunnage continues downstream, engagement with both the converging upper and the lower guide surfaces 62 and 60 becomes increasingly likely. At the downstream end of the lower and upper guide surfaces 60 and 62, adjacent the outlet 54, the downstream end of the lower and upper guide surfaces 60 and 62 may be closely spaced to temporarily compress the strip of dunnage or dunnage product as it moves between the downstream ends of the upper and lower guide surfaces 62 and 60.

The conversion assembly 42 typically stops, and thus the strip of dunnage stops moving downstream, during operation of the severing assembly 44. The upper and lower guide surfaces 62 and 60 may continue to operate during operation of the severing assembly 44 or also may stop. Once the severing assembly 44 has severed a discrete length of dunnage product from the strip of dunnage, the upper and lower guide surfaces 62 and 60 may cooperate to continue to advance the dunnage product out the outlet 54. The inlet 52 at the upstream end of the output chute 46 typically is adjacent an outlet side of the severing assembly 44 and is open to receive the leading end of the strip of dunnage, even if it is very flexible or has a length that is shorter than the length of the outlet chute 46.

Figure 5:
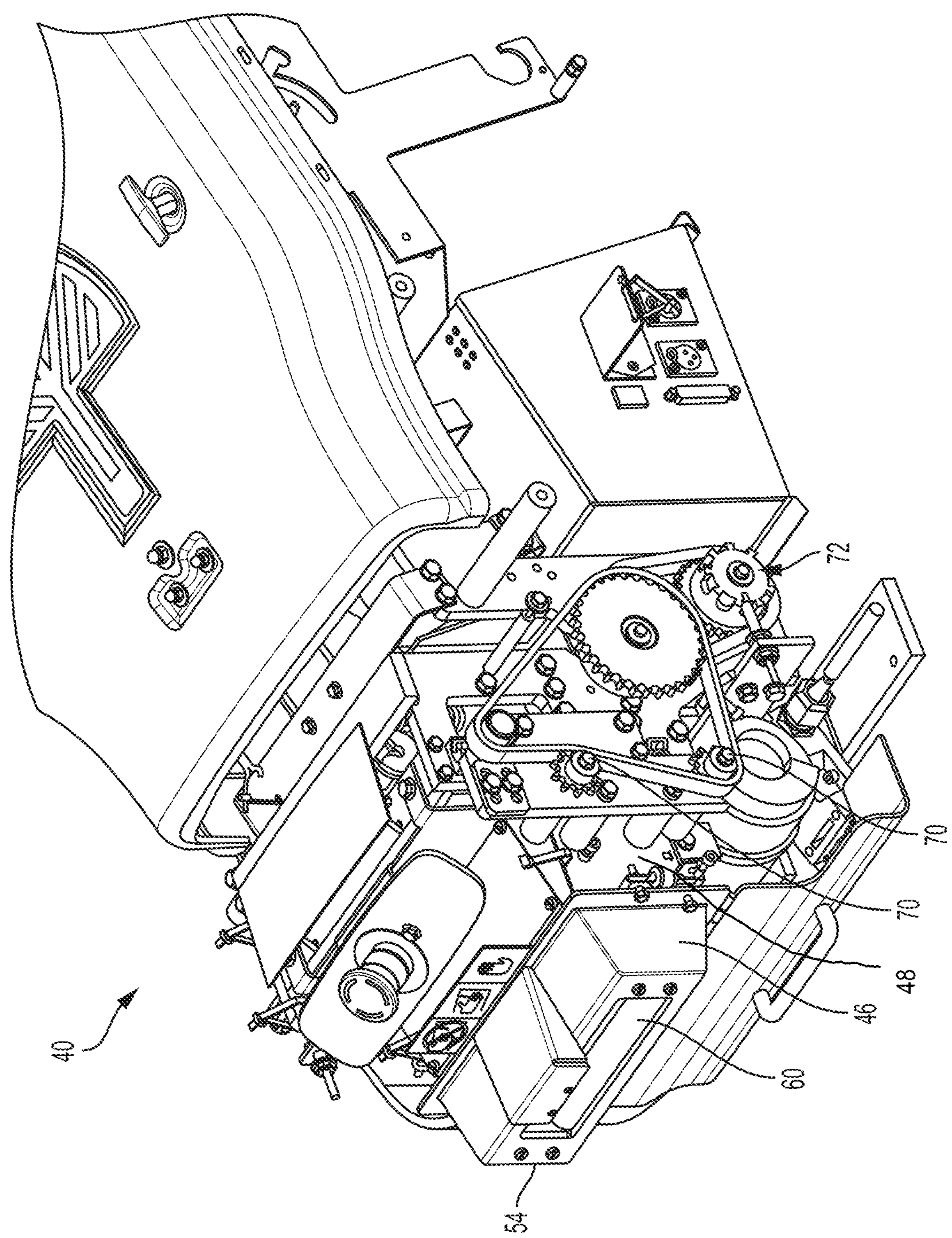
FIG. 5 is an enlarged perspective view of the dunnage conversion machine of FIG. 1, with a portion of the housing removed for illustrations.
Figure 6:
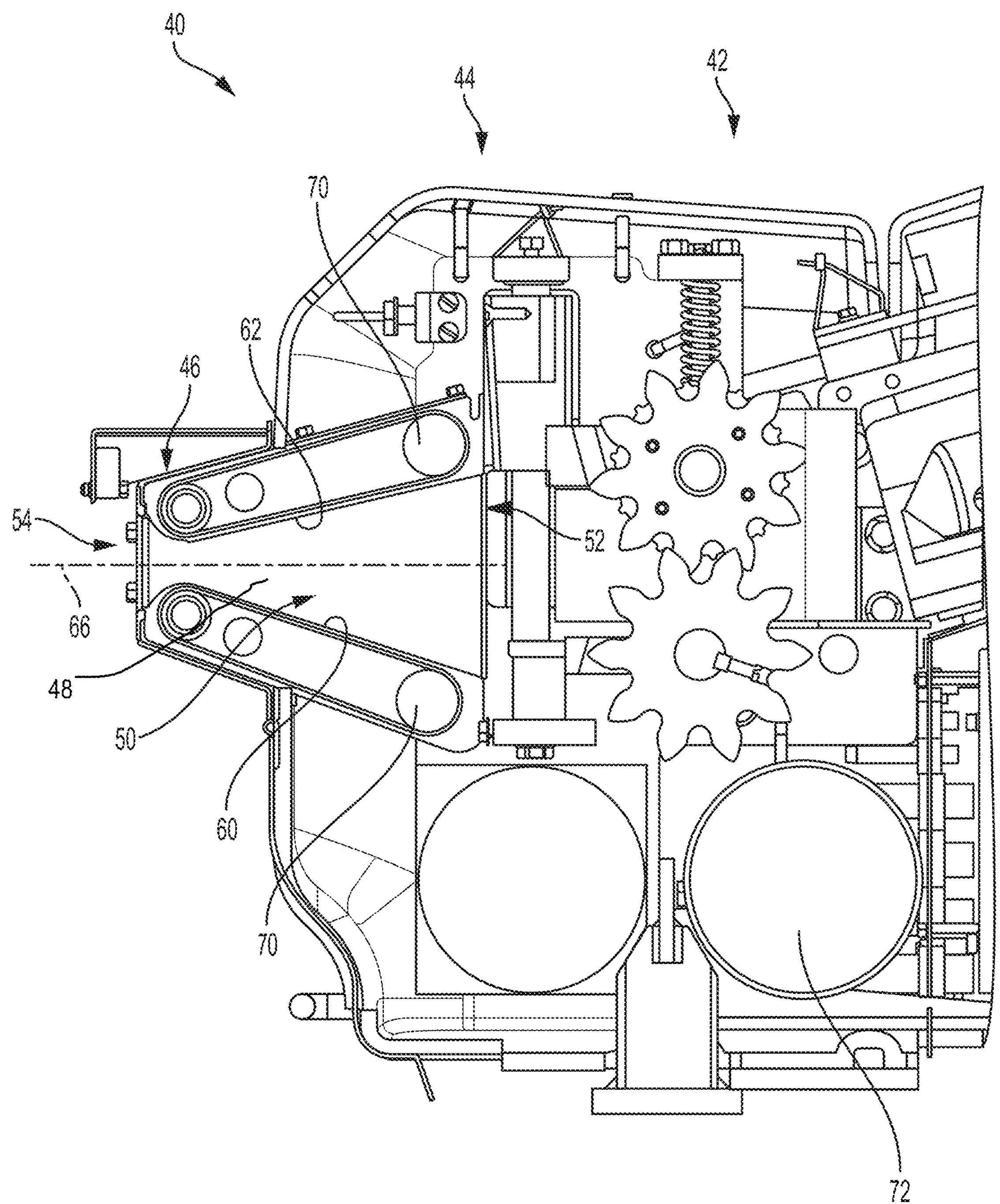
FIG. 6 is an enlarged cross-sectional elevation view of a portion of the dunnage conversion machine of FIG. 2.

As shown in FIG. 5, the lower and upper guide surfaces 60 and 62 may be driven by connection to the motor 72 by extending drive shafts through one of the side walls 64 of the outlet chute 46 to connect a sprocket. The sprocket is powered by a connection to the motor 72 through a chain. The chain is enmeshed with the sprocket teeth. A common motor 72 may be used to power the motive elements of the conversion assembly 42, the severing assembly 44, the lower and upper guide surfaces 60 and 62, or some combination thereof. Consequently, when the conversion assembly 42 is producing a strip of dunnage, the lower and upper guide surfaces also may be advancing to urge the strip of dunnage, and severed discrete dunnage product, through the output chute 46 to the outlet 54. Yet, due to the inclined nature of lower and upper guide surfaces 60 and 62, the strip of dunnage is not subject to excessive friction while the severing assembly 44 acts to sever the dunnage product from the strip of dunnage, while also serving to advance and dispense even dunnage products that are significantly shorter than the output chute 46.

The output chute 46 may be openable in such a manner that opening the output chute 46 also separates the lower and upper guide surfaces 60 and 62 to facilitate access through the outlet chute 46.

While the output chute 46 may be equally employed with a dunnage conversion machine 40 of the type shown in the drawings or a dunnage machine of a different type, the output chute 46 may be used other dunnage conversion machines not shown or described here.

The present invention also may provide an output chute 46 for a dunnage conversion machine 40 that converts a stock material into a less dense dunnage product. As described above, the output chute 46 may include (a) a housing 48 having a passage 50 therethrough, the passage 50 having an inlet 52 at an inlet end, and an outlet 54 at an outlet end spaced from the inlet 52, and the passage extending in a downstream direction from the inlet 52 to the outlet 54, and (b) a lower conveyor belt 60 arranged to define a lower side of the passage 50. The lower conveyor belt 60 may have an upstream end toward the inlet 52 and a downstream end toward the outlet 54, and the upstream end may be spaced from a centerline 66 of the passage 50 further than the downstream end is spaced from the centerline 66 of the passage 50 to provide an inclined surface, such that a cross-section of the passage 50 decreases from the inlet 52 to the outlet 54.

In summary, the present invention provides a dunnage conversion machine 40 that converts a stock material into a less dense dunnage product and includes an outlet chute 46 having a housing 48 with a passage 50 therethrough from an inlet 52 at an inlet end downstream to an outlet 54 at an outlet end spaced from the inlet 52. The output chute 46 includes a lower guide surface 60 that defines a bottom side of the passage 50. The lower guide surface 60 has an upstream end toward the inlet 52 and a downstream end toward the outlet 54. The upstream end of the lower guide surface 60 is spaced from a centerline 66 of the passage 50 a distance that is greater than a distance that the downstream end is spaced from the centerline 66 of the passage 50 to provide an inclined surface, such that a cross-section of the passage 50 decreases from the inlet 52 to the outlet 54.

Although the invention has been shown and described with respect to a certain embodiment, equivalent alterations and modifications will occur to others skilled in the art upon the reading and understanding of this specification. The present invention includes all such equivalent alterations and modifications, and is limited only by the scope of the following claims. Furthermore, the corresponding structures, materials, acts, and equivalents of all means or step plus function elements in the claims below are intended to include any structure, material, or acts for performing the functions in combination with other claimed elements as specifically claimed.

The invention claimed is:

1. A dunnage conversion machine, comprising a conversion assembly having a forming assembly for shaping a stock material into a relatively lower density strip of dunnage, a feed assembly downstream of the forming assembly, the feed assembly having at least one rotating element to draw a stock material through the forming assembly;

a severing assembly downstream of the conversion assembly to sever discrete lengths of dunnage products from the strip of dunnage produced by the conversion assembly; and an output chute downstream of the severing assembly, configured to receive dunnage products from the severing assembly;

wherein the output chute includes a housing having a passage therethrough, the passage having an inlet at an inlet end, and an outlet at an outlet end spaced from the inlet end, the passage extending in a downstream direction from the inlet to the outlet;

wherein the output chute includes a continuous planar lower guide surface that defines a bottom side of the passage, the continuous planar lower guide surface having an upstream end toward the inlet and a downstream end toward the outlet, and the upstream end is spaced from a centerline of the passage a distance that is greater than a distance that the downstream end is spaced from the centerline of the passage to provide an inclined surface, such that a cross-section of the passage decreases from the inlet to the outlet;

wherein the downstream ends of an upper guide surface and the continuous planar lower guide surfaces are in a fixed position; and wherein the continuous planar lower guide surface includes at least one rotating element that is driven to move the continuous planar lower guide surface toward the outlet.

2. The dunnage conversion machine of claim 1, further including a power source adapted to drive at least one of the at least one rotating element.

3. The dunnage conversion machine of claim 2, wherein the continuous planar lower guide surface is defined by a conveyor belt.

4. The dunnage conversion machine of claim 1, wherein the upper guide surface is a continuous planar upper guide surface that defines a top side of the passage that is spaced from and nonparallel to the continuous planar lower guide surface, the continuous planar upper guide surface having an upstream end toward the inlet and a downstream end toward the outlet, the upstream end is spaced from a centerline of the passage a distance that is greater than a distance that the downstream end is spaced from the centerline of the passage to provide an inclined surface; wherein the continuous planar upper guide surface and the continuous planar lower guide surface converge to a minimum spacing therebetween adjacent the outlet.

5. The dunnage conversion machine of claim 4, wherein the continuous planar upper guide surface is defined by a conveyor belt.

6. The dunnage conversion machine of claim 4, wherein each of the continuous planar upper and lower guide surfaces includes at least two rotating members.

7. The dunnage conversion machine of claim 4, wherein adjacent the outlet, the continuous planar upper and lower guide surfaces are closest to each other and spaced apart by 20 mm.

8. The dunnage conversion machine of claim 4, wherein the continuous planar upper and lower guide surfaces are resilient.

9. The dunnage conversion machine of claim 4, wherein a distance from a closest spacing of the continuous planar upper and lower guide surfaces to the input end of the chute is at least 140 mm.

10. The dunnage conversion machine of claim 1, wherein the continuous planar lower guide surface is a conveyor belt configured to provide a continuous surface from the upstream end of the continuous planar lower guide surface to the downstream end of the continuous planar lower guide surface.

11. The dunnage conversion machine of claim 1, wherein output chute includes a housing having left and right side walls that define opposing sides of the passage through the output chute.

12. An output chute for a dunnage conversion machine that converts a stock material into a less dense dunnage product, comprising:

a housing having a passage therethrough, the passage having an inlet at an inlet end, and an outlet at an outlet end spaced from the inlet end, the passage extending in a downstream direction from the inlet to the outlet, and a continuous planar lower conveyor belt arranged to define a lower side of the passage, the continuous planar lower conveyor belt having an upstream end toward the inlet and a downstream end toward the outlet, the upstream end is spaced from a centerline of the passage further than the downstream end is spaced from the centerline of the passage to provide an inclined surface, such that a cross-section of the passage decreases from the inlet to the outlet.

13. The output chute of claim 12, further comprising a continuous planar upper conveyor belt arranged to define an upper side of the passage, the continuous planar upper conveyor belt having an upstream end toward the inlet and a downstream end toward the outlet, the upstream end is spaced from a centerline of the passage further than the downstream end is spaced from the centerline of the passage to provide an inclined surface, such that a cross-section of the passage decreases from the inlet to the outlet.

* * * * *